(12) United States Patent
Mirichigni et al.

(10) Patent No.: US 11,151,027 B2
(45) Date of Patent: *Oct. 19, 2021

(54) METHODS AND APPARATUSES FOR REQUESTING READY STATUS INFORMATION FROM A MEMORY

(71) Applicant: MICRON TECHNOLOGY, INC., Boise, ID (US)

(72) Inventors: Graziano Mirichigni, Vimercate (IT); Danilo Caraccio, Buonalbergo (IT); Luca Porzio, Casalnuovo di Napoli (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,024

(22) Filed: Aug. 27, 2019

(65) Prior Publication Data

US 2019/0384700 A1 Dec. 19, 2019

Related U.S. Application Data

(63) Continuation of application No. 15/786,408, filed on Oct. 17, 2017, now Pat. No. 10,445,228, which is a continuation of application No. 14/506,414, filed on Oct. 3, 2014, now Pat. No. 9,824,004.

(60) Provisional application No. 61/887,222, filed on Oct. 4, 2013.

(51) Int. Cl.
*G06F 12/00* (2006.01)
*G06F 12/02* (2006.01)
*G06F 13/16* (2006.01)
*G06F 3/06* (2006.01)

(52) U.S. Cl.
CPC .......... *G06F 12/023* (2013.01); *G06F 3/0659* (2013.01); *G06F 12/0246* (2013.01); *G06F 13/1642* (2013.01)

(58) Field of Classification Search
None
See application file for complete search history.

(56) References Cited

U.S. PATENT DOCUMENTS

| | | |
|---|---|---|
| 5,469,548 A | 11/1995 | Callison et al. |
| 5,504,868 A | 4/1996 | Krakirian |
| 5,603,066 A | 2/1997 | Krakirian |
| 7,630,369 B1 | 12/2009 | Overby et al. |
| 7,644,205 B1 | 1/2010 | Overby |
| 8,176,232 B2 | 5/2012 | Tedrow et al. |
| 8,296,467 B2 | 10/2012 | Lee |
| 8,386,699 B2 | 2/2013 | Yeh |

(Continued)

FOREIGN PATENT DOCUMENTS

WO 2013111019 A2 8/2013

*Primary Examiner* — Craig S Goldschmidt
(74) *Attorney, Agent, or Firm* — Dorsey & Whitney LLP

(57) ABSTRACT

Methods and apparatuses are disclosed for requesting ready status information from a memory. One example apparatus includes a memory and a host coupled to the memory. The host is configured to provide a plurality of memory access requests to the memory, to request ready status information regarding whether the memory is ready to execute a memory access request of the plurality of memory access requests, and to request execution of the memory access request responsive to the ready status information.

16 Claims, 4 Drawing Sheets

(56) References Cited

U.S. PATENT DOCUMENTS

| | | |
|---|---|---|
| 8,423,722 B1 | 4/2013 | Deforest |
| 8,468,319 B1 | 6/2013 | Satran |
| 8,904,094 B2 | 12/2014 | Matsukawa et al. |
| 8,918,600 B2 | 12/2014 | Galbo et al. |
| 9,015,356 B2 | 4/2015 | Asnaashari et al. |
| 9,454,310 B2 | 9/2016 | Caraccio et al. |
| 9,824,004 B2 | 11/2017 | Mirichigni et al. |
| 10,108,372 B2 | 10/2018 | D'eliseo et al. |
| 2002/0009075 A1 | 1/2002 | Fesas, Jr. et al. |
| 2004/0127255 A1 | 7/2004 | Becker et al. |
| 2005/0114460 A1 | 5/2005 | Chen |
| 2006/0026342 A1 | 2/2006 | Calvignac et al. |
| 2006/0095686 A1 | 5/2006 | Miller |
| 2006/0179179 A1 | 8/2006 | Suzuoki |
| 2006/0271739 A1 | 11/2006 | Tsai et al. |
| 2006/0277349 A1 | 12/2006 | Murdock et al. |
| 2007/0016702 A1 | 1/2007 | Pione et al. |
| 2007/0032200 A1* | 2/2007 | Taneja ............. H04L 1/0018 455/70 |
| 2007/0226401 A1 | 9/2007 | Huang et al. |
| 2008/0040519 A1 | 2/2008 | Starr |
| 2008/0140972 A1 | 6/2008 | Kim et al. |
| 2008/0147893 A1 | 6/2008 | Marripudi |
| 2008/0162735 A1 | 7/2008 | Voigt |
| 2009/0070647 A1* | 3/2009 | Allison ............. G06F 11/106 714/746 |
| 2009/0089492 A1 | 4/2009 | Yoon et al. |
| 2009/0172286 A1 | 7/2009 | Lasser et al. |
| 2009/0228535 A1 | 9/2009 | Rathi |
| 2010/0115152 A1 | 5/2010 | Day et al. |
| 2010/0250785 A1 | 9/2010 | Shin et al. |
| 2010/0262721 A1 | 10/2010 | Asnaashari et al. |
| 2010/0262979 A1 | 10/2010 | Borchers |
| 2010/0312973 A1 | 12/2010 | Galbo et al. |
| 2011/0066837 A1 | 3/2011 | Lee |
| 2011/0161543 A1 | 6/2011 | van Holder et al. |
| 2011/0276725 A1 | 11/2011 | Yun |
| 2012/0011335 A1 | 1/2012 | Asnaashari et al. |
| 2012/0173792 A1* | 7/2012 | Lassa ............. G06F 3/0659 711/103 |
| 2012/0179860 A1 | 7/2012 | Falanga et al. |
| 2012/0254520 A1 | 10/2012 | Roh et al. |
| 2012/0272114 A1 | 10/2012 | Cho et al. |
| 2012/0284587 A1 | 11/2012 | Yu |
| 2012/0324180 A1 | 12/2012 | Asnaashari et al. |
| 2013/0036339 A1 | 2/2013 | Shiraishi |
| 2013/0060981 A1* | 3/2013 | Horn ............. G06F 3/0659 710/107 |
| 2013/0067143 A1 | 3/2013 | Hasegawa et al. |
| 2013/0073795 A1 | 3/2013 | Hasegawa |
| 2013/0073797 A1 | 3/2013 | Chowdhury |
| 2013/0124932 A1 | 5/2013 | Schuh et al. |
| 2013/0145085 A1 | 6/2013 | Yu |
| 2013/0205073 A1 | 8/2013 | Hwang |
| 2013/0262745 A1 | 10/2013 | Lin et al. |
| 2013/0297852 A1 | 11/2013 | Fai et al. |
| 2013/0301373 A1 | 11/2013 | Tam |
| 2013/0326141 A1 | 12/2013 | Marcu |
| 2014/0250262 A1 | 9/2014 | Buxton et al. |
| 2014/0281151 A1 | 9/2014 | Yu |
| 2014/0325519 A1* | 10/2014 | Li ............. H04L 63/102 718/103 |
| 2014/0351456 A1 | 11/2014 | Sharifie et al. |
| 2015/0033234 A1 | 1/2015 | Shacham et al. |
| 2015/0074294 A1 | 3/2015 | Shacham |
| 2015/0100744 A1 | 4/2015 | Mirichigni |
| 2015/0154112 A1 | 6/2015 | Tuers et al. |
| 2015/0160893 A1 | 6/2015 | Gorobets et al. |
| 2015/0199137 A1 | 7/2015 | Shin et al. |
| 2015/0212738 A1 | 7/2015 | D'Eliseo et al. |
| 2015/0234601 A1 | 8/2015 | Tsai et al. |
| 2016/0117102 A1 | 4/2016 | Hong et al. |
| 2016/0364179 A1 | 12/2016 | Tsai et al. |
| 2018/0039572 A1 | 2/2018 | Mirichigni et al. |
| 2019/0018618 A1 | 1/2019 | D'eliseo et al. |

* cited by examiner

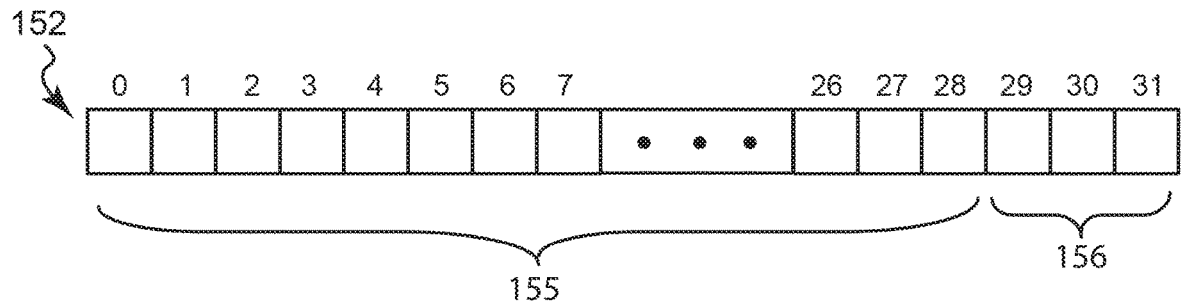

FIG. 2A

| BIT $i$, $i$=0 to 28 | STATUS |
|---|---|
| 0 | $i^{TH}$ REQUEST NOT READY FOR EXECUTION |
| 1 | $i^{TH}$ REQUEST READY FOR EXECUTION |

FIG. 2B

| BIT 29 | BIT 30 | BIT 31 | STATUS |
|---|---|---|---|
| 0 | 0 | 0 | NO REQEUSTS READY FOR EXECUTION; WAIT "SHORT" TIME |
| 1 | 0 | 0 | NO REQUESTS READY FOR EXECUTION; WAIT "MEDIUM" TIME |
| 0 | 1 | 0 | NO REQUESTS READY FOR EXECUTION; WAIT "LONG" TIME |
| 1 | 1 | 0 | NO REQUESTS READY FOR EXECUTION; NO WAIT TIME PROVIDED |
| 1 | 1 | 1 | ONE OR MORE REQUESTS READY FOR EXECUTION |

FIG. 2C

METHODS AND APPARATUSES FOR REQUESTING READY STATUS INFORMATION FROM A MEMORY

CROSS-REFERENCE TO RELATED APPLICATION(S)

This application is a continuation of U.S. patent application Ser. No. 15/786,408, filed Oct. 17, 2017 and issued as U.S. Pat. No. 10,445,228 on Oct. 15, 2019, which is a continuation of U.S. patent application Ser. No. 14/506,414, filed Oct. 3, 2014 and issued as U.S. Pat. No. 9,824,004 on Nov. 21, 2017, which claims the filing benefit of U.S. Provisional Patent Application No. 61/887,222, filed. Oct. 4, 2013. These applications and patents are incorporated by reference herein in their entirety and for all purposes.

BACKGROUND OF THE INVENTION

In an apparatus where data is to be transferred from a host to a memory, the data may be transferred in several different manners. In one example, the host may send a command to the memory (along with data to be written to the memory in the case of a write command) and the memory may execute the command without any further processing or other interaction from the host or memory. In order to accomplish this manner of data transfer, a number of different control signals may need to be provided from the host to the memory on dedicated signal lines—for example, a write enable signal, a read enable signal, an address latch enable signal, a command latch enable signal, a chip enable signal, and so forth may need to be generated by the host and provided to the memory.

In other examples, the number of control signals provided from the host to the memory (and therefore the number of signal lines between the host and the memory) may be reduced in order to simplify the interface between the host and the memory. In these examples, however, the memory may need to do additional processing on the commands and data received from the host in order to correctly read or write the memory. This manner of data transfer also allows multiple memory access requests to be sent from the host to the memory before one or more of those memory access requests are executed. The multiple memory access requests may be queued until the memory is ready to execute them, and the memory may provide ready status information to the host regarding the readiness of the memory to execute the queued memory access requests. This ready status information may be provided to the host by continuously sending the ready status information to the host in some examples, but such continuous transfer of ready status information (whether via continuous polling of the memory or via a dedicated signal line that triggers an interrupt or other action) may unnecessarily consume power and/or unnecessarily use signal lines.

BRIEF DESCRIPTION OF THE DRAWINGS

FIG. 2A is a block diagram of a queue status register according to an embodiment of the invention.

FIG. 2B is a table of different bit values for the queue status register of FIG. 2A and status information corresponding to those different bit values, according to an embodiment of the invention.

FIG. 2C is another table of different bit values for the queue status register of FIG. 2A and status information corresponding to those different bit values, according to an embodiment of the invention.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Figure 1:
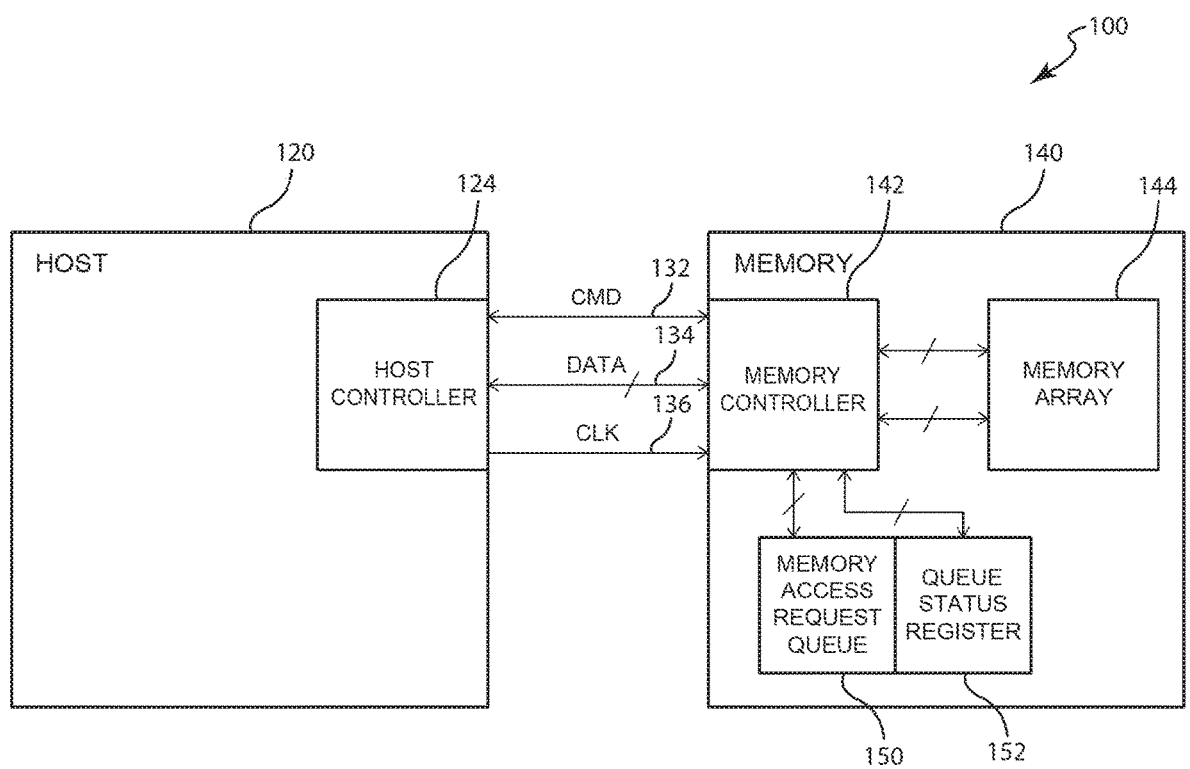
FIG. 1 is a block diagram of an apparatus with a host that can request ready status data from a memory according to an embodiment of the present invention.

FIG. 1 illustrates an apparatus 100 with a host 120 coupled to a memory 140, according to an embodiment of the invention. As used herein, apparatus may refer to, for example, an integrated circuit, a memory device, a memory system, an electronic device or system, a smart phone, a tablet, a computer, a server, etc.

The host 120 includes a host controller 124, and is configured to provide (e.g., issue) commands to the memory 140, for example, a plurality of memory access requests. The memory access requests may be requests to read data from the memory 140, to write data into the memory 140, or otherwise access and potentially manipulate the data in the memory 140. In other words, a memory access request may correspond with a data transfer being requested, and in some embodiments may include parameters related to a direction (e.g., read, write) of the respective data transfer, a size of the respective data transfer, a priority of the respective data transfer, and/or an assigned request identification number of the respective data transfer.

The host 120 is further configured to provide commands such as status requests to the memory 140 in order to request ready status information from the memory 140 regarding whether the memory 140 is ready to execute the memory access requests previously provided to the memory 140. The ready status information may include an indication of whether the memory is ready to execute one or more of the plurality of memory access requests and may also include an indication of when the memory 140 may be ready to execute one or more of the plurality of memory access requests (if, for example, the memory 140 is not yet ready to execute one or more of the plurality of memory access requests). In some embodiments, the ready status information may indicate whether the memory 140 is ready to execute any one of the plurality of memory access requests, whether the memory is ready to execute multiples ones of the plurality of memory access requests, whether the memory is ready to execute all of the plurality of memory access requests, etc.

In some embodiments, the indication of when the memory may be ready to execute one or more of the plurality of memory access requests includes an amount of time after which the memory 140 will be ready to execute one or more of the plurality of memory access requests. In other embodiments, the indication of when the memory may be ready to execute one or more of the plurality of memory access requests includes an amount of time after which the memory expects to be ready to execute one or more of the plurality of memory access requests—if for example subsequent events could cause the memory to not be ready after the amount of time indicated. The host 120 is also configured to provide commands such as execution requests to the memory 140, responsive to the ready status information received from the memory 140, in order to request execution of one or more of the memory access requests that the memory 140 is ready to execute.

The memory 140 includes a memory controller 142 coupled to a memory array 144, which may be a non-volatile (e.g., NAND flash, phase change material, etc.) memory array 144 in some embodiments. The controller 142 is configured to access the memory array 144 by executing memory access requests received from the host 120. In one embodiment, the memory controller 142 together with the memory array 144 together form an embedded multimedia card (eMMC). The eMMC may also include other components in some embodiments, such as additional hardware and firmware.

The memory 140 also includes a memory access request queue 150, and a queue status register 152 configured to indicate the status of the memory access requests in the memory access request queue 150. The memory 140 is configured to receive the plurality of memory access requests, status requests, and execution requests from the host 120. The memory 140 may also be configured to provide the ready status information to the host 120, responsive to the status requests, based on whether the memory 140 is ready to execute one or more of the plurality of memory access requests previously received from the host 120. The memory 140 may also be configured to provide an indication of when the memory 140 may be ready to execute one or more of the plurality of memory access requests in response to a status request, such as if the memory 140 is not ready to execute any of the plurality of memory access requests previously received from the host 120. The memory 140 may be configured to provide the ready status information to the host 120 by providing the host 120 with the contents of the queue status register 152.

The ready status information provided by the memory 140 to the host 120 may be embedded within a larger response to the status request in some embodiments. For example, the larger response may include an acknowledgment of receipt of the status request from the host 120, error checking information such as a cyclic redundancy check, and so forth.

The memory access request queue 150 is configured to queue one or more memory access requests received from the host 120. In some embodiments, a plurality (e.g., two, three, ten, twenty, thirty, etc.) of memory access requests may be provided from the host 120 to the memory 140 before the memory 140 executes one or more of the previously received memory access requests. The queue status register 152 may be configured to maintain an indication of readiness for execution corresponding to one or more of the plurality of memory access requests received from the host 120, for example, as described below with reference to FIG. 2B. As also described below with reference to FIG. 2C, the queue status register 152 may further be configured to maintain an indication of when the memory 120 may be ready to execute one or more of the plurality of memory access requests, e.g., in the event that the memory 120 is not ready to execute one or more of the received memory access requests that have not yet been executed.

The apparatus 100 in FIG. 1 also includes a CMD bus 132, a DATA bus 134, and a CLK signal line 136 coupled between the host 120 and the memory 140. In some embodiments, and with reference to FIG. 1, the CMD bus 132 may be a 1-bit wide serial bus that is bidirectional (e.g., can receive information from both the host 120 and the memory 140, with information received from one direction propagating towards the other direction). For example, the host 120 may be configured to provide commands—such as memory access requests, status requests, execution requests, and so forth—to the memory 140 via the CMD bus 132. Similarly, the memory 140 may be configured to provide the ready status information to the host 120 (responsive to the status requests from the host 120) via the CMD bus 132.

The DATA bus 134 may be several bits (e.g., 8 bits) wide in some embodiments, and may also be bidirectional. The host 120 may be configured to provide data (e.g., write data to be written to the memory 140) to the memory 140 via the DATA bus 134, and the memory 140 may be configured to provide data (e.g., read data that is read from the memory 140) to the host 120 via the DATA bus 134.

The CLK signal line 136 provides a reference clock from the host 120 to the memory 140, which may be used as a strobe signal to clock commands and/or data provided between the host 120 and the memory 140 on the CMD bus 132 and the DATA bus 134.

In some embodiments, the ready status information provided to the host 120 includes an indication of whether the memory 140 is ready to execute memory access requests received from the host 120 and queued in the memory access request queue 150. The ready status information may also include remaining wait length information (e.g., the amount of time before the memory 140 may be ready to execute at least one of the memory access requests). In some embodiments, the ready status information may be based on whether the DATA bus 134 is available for data transmission between the host 120 and the memory 140. In some embodiments, the ready status information provided to the host 120 may only be valid for a duration of time after it is provided by the memory 140, and/or may only be valid if there are no intervening commands or requests made of the memory 140. For example, ready status information indicating that a memory access request or several memory access requests are ready for execution may only be valid for 100 milliseconds, and may further become invalid if the host 120 provides an additional memory access request to the memory 140 that, for example, has a higher priority than the memory access requests currently pending in the memory access request queue 150.

Referring still to FIG. 1, in operation, the host 120 provides a plurality of memory access requests to the memory 140 by, for example, providing the memory access requests to the CMD bus 132. The memory 140 in turn receives the plurality of memory access requests from the host 120 via the CMD bus 132. In some embodiments, the host 120 may assign a request identification number to one or more of the plurality of memory access requests before providing the memory access requests to the memory 140. In other embodiments, however, the host 120 may provide memory access requests to the memory 140 without reference identification numbers, and the memory 140 may assign request identification numbers to the received memory access requests.

After the memory 140 receives one or more memory access requests from the host, the memory may prepare itself to execute the one or more memory access requests. The memory may prepare itself, for example, by inspecting the memory access requests already in the memory access request queue 150, performing error handling operations related to received memory access requests, ordering the memory access requests in order to improve performance of the memory during execution of those requests or in order to conform to priorities assigned to the requests by the host 120, updating the memory access request queue 150 and the queue status register 152 based on the newly received memory access request, and so forth.

After providing one or more memory access requests, the host 120 may provide a status request in order to request ready status information from the memory 140. In response to the status request from the host 120, the memory 140 provides the ready status information to the host 120 via the CMD bus 132. The ready status information may be indicative of whether the memory is ready to execute one or more of the plurality of memory access requests, and an estimated relative wait time before the memory may be ready to execute one or more of the plurality of memory access requests (e.g., if the memory is not yet ready to execute any of the plurality of memory access requests). The estimated relative wait time may be determined based on the respective priorities of memory access commands in the memory access request queue 150, the memory address tables in the memory controller's 142 cache, the status of the memory controller's 142 cache, the number of memory arrays 144 within the memory 140, and so forth.

In some embodiments, separate ready status information (or separate indications within a single ready status information) may be provided for respective ones of a plurality of memory access requests provided to the memory 140. For example, for respective ones of the plurality of memory access requests, the ready status information may include an indication of whether the memory 140 is ready to execute that specific memory access request and/or an indication of when the memory may be able to execute that specific memory access request, with indications of whether the memory 140 is ready to execute another specific memory access request and when the memory may be able to execute that other specific memory access request being provided in separate ready status information, or provided in separate parts of a single ready status information. In some examples, separate indications may be provided for each respective memory status request, whereas in other embodiments separate indications may be provided only for different types of memory access requests (e.g., one indication for all reads, one indication for all writes, etc.), and in still other embodiments, one type of indication (e.g. whether the memory is ready) may be provided for each respective memory access request and one type of indication (e.g., when the memory will be ready to execute one or more memory access requests) is provided for the memory access requests collectively.

The host 120, after receiving ready status information from the memory 140 indicating that one or more requests are ready for execution, may provide an execution request to the memory responsive to that ready status information. The execution request may correspond to one of the memory access requests received from the host 120—for example, if the ready status information indicates that the memory access request that has been assigned request identification number 1 is ready to be executed by the memory 140, the host may request execution of that memory access request that was previously provided to the memory.

If, on the other hand, the host 120 receives ready status information from the memory 140 indicating that no requests are ready for execution along with an estimated relative wait time before the memory may be ready, the host 120 may provide an execution request to the memory 140 only after the estimated relative wait time has expired. In some embodiments, after the estimated relative wait time has expired, the host 120 again requests the status ready information from the memory 140 before sending an execution request—in other words, the host 120 may wait to provide the execution request to the memory 140 until the ready status information received responsive to a future status request indicates that the memory access request corresponding to that execution request is ready for execution. However, in other embodiments, and where there is only a single request in the memory access request queue 150, the host 120 may request execution of that single request after the estimated relative wait time has expired without requesting another status update from the memory 140.

As mentioned above, in some embodiments, the host 120 may request ready status information, or request execution of a previously sent memory access request, only after the estimated relative wait time has expired. The host 120 may wait to send the next request until the estimated relative wait time has expired because, for example, the memory 140 may not update the wait time information until the estimated relative wait time previously communicated to the host 120 has expired (e.g., in order to save compute resources on the memory). In other embodiments, however, the host 120 may request updated ready status information, or execution of a previously sent request, before the estimated relative wait time has expired if, for example, the memory 140 continuously updates the wait time information in the queue status register 152. In one example, the host 120 may request either the ready status information or execution of a previously sent memory access request shortly (e.g., a few milliseconds) before the end of the estimated relative wait time. Sending another request to the memory 140 before the estimated relative wait time has expired may be useful if the estimated relative wait time cannot be accurately estimated, if the granularity of the estimated wait time is great, if the operation currently being executed is completed in a shorter time than estimated, and so forth.

FIG. 2A illustrates an embodiment of the queue status register 152 according to an embodiment of the invention. As illustrated in FIG. 2A, the queue status register 152 includes a first collection of registers 155 configured to store indications of readiness corresponding to a plurality of memory access requests received by the memory 140. In some embodiments, the first collection of registers 155 may be mapped one-to-one to pending memory access requests, with the bit position i in the queue status register 155 corresponding to a request identification number assigned to the respective request. The queue status register 152 in FIG. 2A also includes a second collection of registers 156 that are configured to store remaining wait length information for the memory access request queue 150. The first and second collections of registers 155, 156 together define the queue status register 152, and collective hold ready status information relating to a plurality of memory access requests received by the memory 140.

FIG. 2B illustrates values that the bits in the first collection of registers 155 may take during operation of the queue status register 152. For example, the bit in the $0^{th}$ position of the queue status register 152 may store an indication that the memory access request that has been assigned a request identification number of 0 is or is not ready for execution. When the bit in the $0^{th}$ position is a logic low (e.g., 0), this may correspond to the $0^{th}$ memory access request not being ready for execution, whereas when the bit in the $0^{th}$ position is a logic high (e.g., 1), this may correspond to the $0^{th}$ memory access request being ready for execution. In this manner, the first collection of registers 155 in the queue status register 152 indicate which of the memory access requests received by the memory 140 are ready for execution.

FIG. 2C illustrates values that the bits in the second collection of registers 156 may take during operation of the queue status register 152. In general, the bits in the second collection of registers 156 may represent an amount of time remaining (e.g., a variable latency) before which the memory may be ready to execute one or more memory access requests. For example, bits 29, 30, and 31 all being logic low may indicate that no memory access requests are ready for execution, and that the memory may be ready to execute one or more of the memory access requests in a "short" time, such as 10 milliseconds. When provided to the host 120, this information may indicate that the host 120 should wait that "short" amount of time before requesting execution of the memory access requests previously provided to the memory 140. Similarly, bits 30 and 31 being logic low while bit 29 is logic high may indicate that no memory access requests are ready for execution, and that the memory may be ready to execute one or more of the memory access requests in a "medium" time, such as 50 milliseconds. When provided to the host 120, this information may indicate that the host 120 should wait that "medium" amount of time before requesting execution of the memory access requests previously provided to the memory 140. Similarly, bits 29 and 31 being logic low while bit 30 is logic high may indicate that no memory access requests are ready for execution, and that the memory may be ready to execute one or more of the memory access requests in a "long" time, such as 200 milliseconds. When provided to the host 120, this information may indicate that the host 120 should wait that "long" amount of time before requesting execution of the memory access requests previously provided to the memory 140.

The bits in the second collection of registers 156 may take on still other values. For example, still referring to FIG. 2C, bit 31 being logic low while bits 29 and 30 are logic high may indicate that no memory access requests are ready for execution, but that no wait time information is available or being provided by the memory 140. This may be the case if, for example, the memory 140 does not support providing variable latency information to the host 120, or if the memory 140 is not ready yet to provide it to the host 120. As still another example, bits 29, 30, and 31 being logic high may indicate that one or more of the memory access requests are ready for execution. This information may be obtained by, for example, calculating the logical OR of the first collection of registers 155. Although the second collection of registers 156 illustrated in FIGS. 2A and 2C includes 3 bits of the queue status register 150, in other embodiments, the second collection of registers may indicate wait time information using fewer or more bits of the queue status register to represent the variable latency.

Also, in those embodiment where the queue status register 150 includes separate ready status information for a plurality of different memory access requests, each register in the first collection of registers 155 (indicating the ready status of a particular memory access commend) may correspond to one or more bits in the second collection of registers 156 (indicating the estimated relative wait time until the memory 140 is ready to execute the corresponding memory access request). In still other embodiments, the queue status register 150 may include more than two collections of registers—for example the queue status register 150 may include one collection of registers with ready status information for a plurality of different memory access requests, and two or more additional collections of registers, the two or more additional collections of registers including estimated relative wait time information corresponding to separate ones of the plurality of different memory access requests.

Referring now to FIGS. 2A through 2C, the queue status register 152 can thus store indications of both the readiness of the memory 140 to execute memory access requests received by the memory 140 as well as an indication of an amount of time before the memory 140 may be ready to execute one or more of the memory access requests. By including both types of indications in the queue status register 152, when the memory 140 provides the contents of the queue status register 152 to the host 120 in response to a status request, the host 120 will receive wait timing information related to the memory access requests, including if the memory 140 is not ready to execute any of the memory access requests. In this manner, a dedicated signal line for providing ready status information may not be needed, and the queue status register 150 does not need to be continuously checked to see whether it is ready—instead, the ready status information includes the wait timing information so that the host can sparingly request additional ready status information and request execution of memory access requests that are ready for execution.

Figure 3:
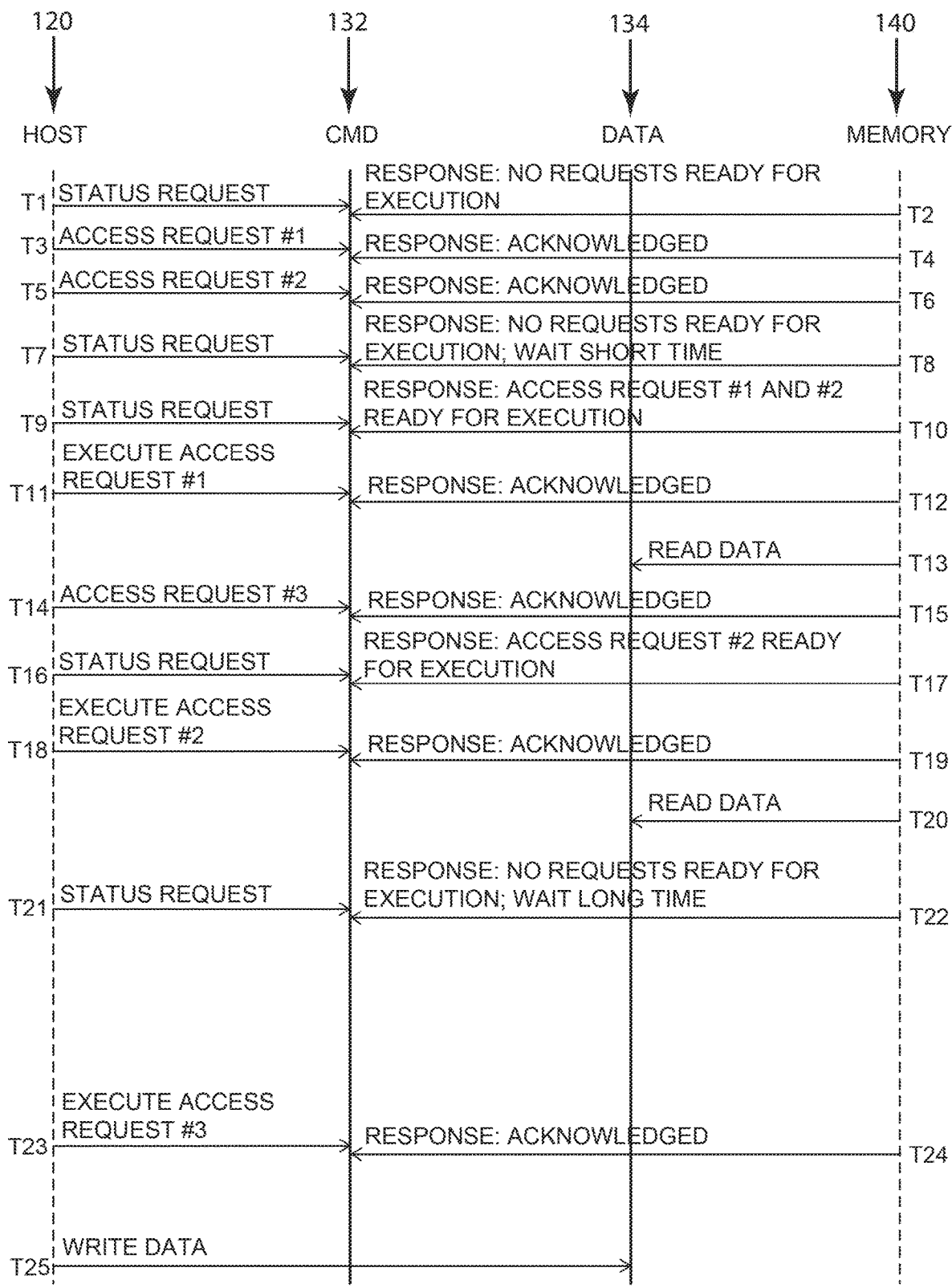
FIG. 3 is a timing diagram illustrating the operation of the apparatus of FIG. 1, according to an embodiment of the invention.

Referring now to FIG. 3, one example of operation of the host 120 and memory 140 of FIG. 1, and the queue status register 152 of FIGS. 1 and 2A will be described. At time T1, the host 120 provides a status request to the memory 140 via the CMD bus 132 in order to request ready status information from the memory 140. At time T2, the memory responds to the status request by acknowledging receipt of the status request and providing the contents of the queue status register 150 to the host via the CMD bus 132. In this instance, because no memory access requests have been received by the memory 140, the response provided by the memory 140 is that no requests are ready for execution.

At time T3, the host 120 provides a first memory access request to the memory 140 via the CMD bus 132, where the first memory access request is a read request. The memory 140 responds at time T4 with an acknowledgment of receipt of the first access request. Upon receipt of the first memory access request, the memory controller 142 may initialize the indication of whether the memory 140 is ready to execute the first memory access request to "not ready for execution" by setting the corresponding bit in the queue status register 152 to a logic low. Further, the memory 140 may begin preparing itself to execute the first memory access request after receiving it so that it can change the indication of whether it is ready to execute the first memory access request after the preparations are complete.

Although FIG. 3 illustrates the first memory access request being provided by the host 120 as a single command, and a single response being provided by the memory 140, in some embodiments, memory access requests may be split into two different commands, which may cause the memory 140 to respond separately with two separate responses.

At time T5, the host 120 provides a second read memory access request to the memory 150 via the CMD bus 132, and the memory 150 responds at time T6 with an acknowledgment of receipt of the second access request. At time T6, the memory has received a plurality of memory access requests, none of which have been executed yet. In some embodiments, when the memory 140 receives a new memory access request from the host 120, the memory 140 may reconsider the requests it has previously indicated as being ready or not ready for execution based on the priorities of the newly received memory access request and the previously received memory access requests. For example, if the newly received memory access request has a high priority whereas the previously received and still unexecuted memory access requests in the memory access request queue have low priorities, the memory 140 may revoke the readiness to execute those lower priority requests in order to prepare the memory 140 to execute the newly received high priority memory access request. In general, the memory access requests may, in some embodiments, become ready for execution based on respective priorities assigned by the host 120 to respective ones of the plurality of memory access requests.

At time T7, the host 120 provides a status request to the memory 140, and the memory 140 responds at time T8 by providing the contents of the queue status register 150 to the host 120 via the CMD bus 132. In this instance, because the memory 140 is still preparing to execute the first and second memory access requests, the response provided by the memory 140 is that no requests are ready for execution, but that the memory 140 may be ready to execute at least one of the first or second memory access requests after a short period of time.

Accordingly, the host 120 waits a short period of time (between T8 and T9), and then again provides a status request to the memory 140 via the CMD bus 132. This time, the contents of the queue status register 150 provided to the CMD bus 132 at time T10 indicate that the memory is ready to execute both of the first and second memory access requests. At this point, the host 120 can decide which of the first or second memory access requests it would like to execute first, as the memory 140 has indicated that it is equally ready to execute either the first memory access request or the second memory access request. Therefore, at time T11, the host 120 requests that the memory 140 execute the first memory access request by providing an execution request for the first memory access request on the CMD bus 132. The memory 140 responds at time T12 with an acknowledgment that the execution response was safely received and that it will soon start sending data, as the first memory access request is a read request. Then, at time T13, the memory 140 executes the first memory access request by providing read data to the DATA bus 134, which is received at the host 120.

After or during completion of the memory 140 providing the read data to the host 120 via the DATA bus 134, the host 120 provides a third memory access request to the memory 140 via the CMD bus 132 at time T14, which third memory access request may be a write request. At time T15, the memory 140 responds by acknowledging receipt of the third memory access request.

At time T16, the host 120 provides another status request to the memory 140 via the CMD bus 132, and the memory responds at time T17 that the second access request is ready for execution. Accordingly, at time T18, the host 120 sends an execution request to the memory 140 via the CMD bus 132 requesting that the memory 140 execute the second access request. The memory 140 responds at time T19, and then executes the second memory access request at time T20 by providing read data from the memory 140 onto the DATA bus 134.

At time T21, the host 120 provides still another status request to the memory 140 via the CMD bus 132. Because the memory 140 is still preparing for the third memory access request, which is a write request, the memory responds at time T22 that no requests are ready for execution and that the memory may not be ready to execute the sole request in the memory access queue for a long time. The host 120 then waits the long amount of time before providing an execution request to the CMD bus 132 at time T23 to execute the third memory access request, which the memory acknowledges at time T24, and the host accordingly starts sending the write data at time T25 onto the DATA bus 134. Note that after waiting the long amount of time dictated by the response at time T22, the host 120 at time T23 requested execution of the third memory access request without requesting the ready status information again.

Figure 4:
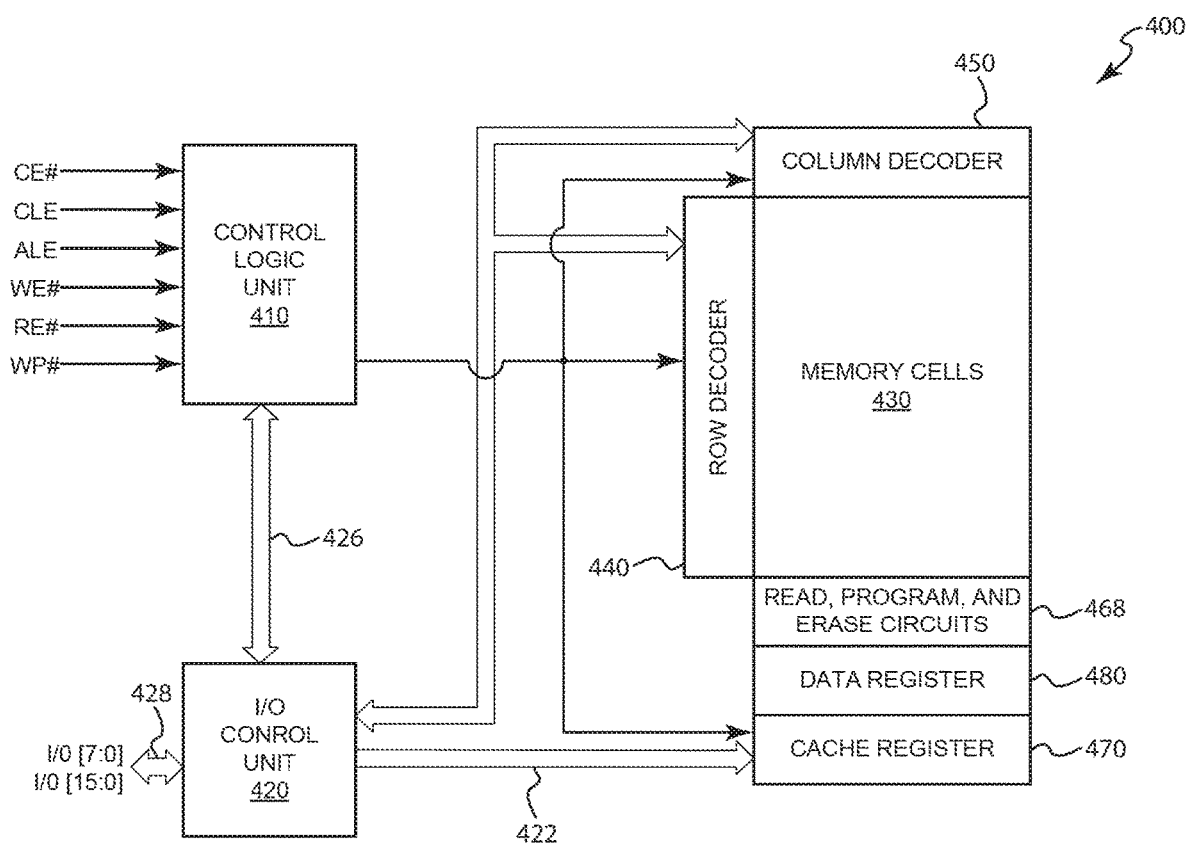
FIG. 4 is a block diagram of a memory array, according to an embodiment of the invention.

FIG. 4 illustrates a memory array 400 according to an embodiment of the invention. The memory array 400 may be used as the memory array 144 in the apparatus 100 of FIG. 1 in some examples, and includes a plurality of memory cells 430. The memory cells 430 may be non-volatile memory cells, such as NAND or NOR flash cells, phase change memory cells, or may generally be any type of memory cells.

Command signals, address signals and write data signals may be provided to the memory 400 as sets of sequential input/output ("I/O") signals transmitted through an I/O bus 428. Similarly, read data signals may be provided from the memory 400 through the I/O bus 428. The I/O bus 428 is connected to an I/O control unit 420 that routes the signals between the I/O bus 428 and an internal data bus 422, an internal address bus 424, and an internal command bus 426. The memory 400 also includes a control logic unit 410 that receives a number of control signals either externally or through the command bus 426 to control the operation of the memory 400.

The address bus 424 applies block-row address signals to a row decoder 440 and column address signals to a column decoder 450. The row decoder 440 and column decoder 450 may be used to select blocks of memory or memory cells for memory operations, for example, read, program, and erase operations. The row decoder 440 and/or the column decoder 450 may include one or more signal line drivers configured to provide a biasing signal to one or more of the signal lines in the memory array 430. The column decoder 450 may enable write data signals to be applied to columns of memory corresponding to the column address signals and allow read data signals to be coupled from columns corresponding to the column address signals.

In response to the memory commands decoded by the control logic unit 410, the memory cells in the array 430 are read, programmed, or erased. Read, program, and erase circuits 468 coupled to the memory array 430 receive control signals from the control logic unit 410 and include voltage generators for generating various pumped voltages for read, program and erase operations.

After the row address signals have been applied to the address bus 424, the I/O control unit 420 routes write data signals to a cache register 470. The write data signals are stored in the cache register 470 in successive sets each having a size corresponding to the width of the I/O bus 428. The cache register 470 sequentially stores the sets of write data signals for an entire row or page of memory cells in the array 430. All of the stored write data signals are then used to program a row or page of memory cells in the array 430 selected by the block-row address coupled through the address bus 424. In a similar manner, during a read operation, data signals from a row or block of memory cells selected by the block-row address coupled through the address bus 424 are stored in a data register 480. Sets of data signals corresponding in size to the width of the I/O bus 428 are then sequentially transferred through the I/O control unit 420 from the data register 480 to the I/O bus 428.

From the foregoing it will be appreciated that, although specific embodiments of the invention have been described herein for purposes of illustration, various modifications may be made without deviating from the spirit and scope of the invention. For example, FIG. 1 illustrates embodiment of a host 120, a host controller 124, a memory 140, a memory controller 142, a memory array 144, a memory access request queue 150, a queue status register 152, and so forth, FIG. 2A illustrates an embodiment of a queue status register 152, and FIG. 4 illustrates an embodiment of a memory array 400. However, other hosts, host controllers, memories, memory controllers, memory arrays, memory access request queues, queue status registers, and so forth may be used, which are not limited to having the same design, and may be of different designs and include circuitry different from the circuitry in the embodiments illustrated in the figures.

Furthermore, although FIGS. 2A and 2C describe a queue status register 152 that stores the variable latency information (which may be continuously updated or may be updated only upon receipt of a status request from the host 120), in other embodiments the queue status register 152 may not physically store any variable latency information. Instead, the variable latency information may be calculated by the memory 140 upon receipt of a status request from the host 120, and sent together with the ready status of individual memory access requests to the host 120 without being stored in the queue status register 152 at all.

Furthermore, although FIGS. 2A through 2C describe a queue status register 152 that stores variable latency information for the entire memory access queue 150 (i.e., a relative wait time before the memory 140 may be ready to execute any one of the memory access requests in the queue 150), in another embodiment, and as described above, the queue status register 152 may store variable latency information for a plurality of the memory access requests so that the host 120 can know when a specific memory access request should be ready for execution, as opposed to knowing only when any one memory access request in the queue 150 is ready.

Accordingly, the invention is not limited to the specific embodiments of the invention described herein.

What is claimed is:

1. An apparatus, comprising:
    a host configured to provide a plurality of memory access requests and a status request to a memory, wherein the host is further configured to receive ready status information from the memory, wherein the ready status information comprises an estimated relative wait time before the memory will be ready to execute a memory access request of the plurality of memory access requests; wherein, in response to expiration of the estimated relative wait time received via the ready status information, the host is further configured to:
        provide an execution request of an at least one outstanding memory access request of the plurality of memory access requests without requesting an update of the estimated relative wait time if a total number of the at least one outstanding memory access request of the plurality of memory access remaining queued for execution is equal to one; and
        provide a request for an update of the estimated relative wait time for the memory to be ready to execute the at least one outstanding memory access request of the plurality of memory access requests if the total number of the at least one outstanding memory access request of the plurality of memory access remaining queued for execution is greater than one.

2. The apparatus of claim 1, wherein the ready status information is an indication as to whether the memory is currently ready to execute the plurality of memory access requests.

3. The apparatus of claim 2, further comprising the memory comprising registers configured to store the indication of whether the memory is ready to execute the plurality of memory access requests.

4. The apparatus of claim 1, wherein the host is further configured to wait to provide the execution request until the ready status information indicates that the memory access request of the plurality of memory access requests is ready for execution.

5. The apparatus of claim 4, wherein the host comprises a queue status register configured to maintain respective indications of when the memory may be ready to execute each of the plurality of memory access requests.

6. The apparatus of claim 1, wherein an order of when the plurality of memory access requests become ready for execution is based on respective priorities assigned by the host to the plurality of memory access requests.

7. The apparatus of claim 1, wherein the host is configured to receive the ready status information from the memory via a command bus.

8. The apparatus of claim 1, wherein the memory is a non-volatile memory.

9. An apparatus, comprising:
    a host configured to couple to a memory and configured to receive an estimated relative wait time from the memory indicating an amount of time before the memory will be ready to execute a memory access request of the plurality of memory access requests, wherein the host is further configured to, in response to an elapsed time starting from receipt of the estimated relative wait time exceeding the estimated relative wait time:
    determine a count of a total number of at least one outstanding memory access request of the plurality of memory access requests that are queued for execution;
    if the count is greater than one:
        request an update of an estimated relative wait time for the memory to be ready to execute the at least one outstanding memory access requests of the plurality of memory access requests; and
        request execution of a memory access request of the at least one outstanding memory access request of the plurality of memory access requests by the memory after the updated estimated relative wait time received in response to the request has elapsed; and
    if the count is equal to one, request execution of the one outstanding memory access request of the plurality of memory access requests without requesting the update of the estimated relative wait time.

10. The apparatus of claim 9, wherein the host is further configured to request execution of the memory access request in response to the updated ready status information.

11. The apparatus of claim 9, wherein the host is further configured to request execution of the plurality of memory access requests.

12. The apparatus of claim 9, wherein the host is configured to provide a request for the estimated relative wait time to the memory.

13. The apparatus of claim 9, wherein the host is configured to receive the estimated relative wait time from the memory via a command bus.

14. The apparatus of claim 9, Wherein the memory is a non-volatile memory.

15. A method, comprising:
receiving, at a host from a memory, an estimated relative wait time before the memory will be ready to execute a plurality of memory access requests; and
in response to an elapsed time starting from receipt of the estimated relative wait time exceeding the estimated relative wait time:
requesting an updated estimated relative wait time for the memory to be ready to execute at least one outstanding memory access request of the plurality of memory access requests, if the total number of the at least one outstanding memory access request of the plurality of memory access remaining queued for execution is greater than one; and
requesting execution of a memory access request of the at least one outstanding memory access request of the plurality of memory access requests by the memory without requesting an update of the estimated relative wait time if the total number of the at least one outstanding memory access request of the plurality of memory access remaining queued for execution is equal to one.

16. The method of claim 15, further comprising requesting execution of a memory access request of the plurality of memory access requests responsive to updated ready status information.

* * * * *